United States Patent [19]

Devine

[11] Patent Number: 4,504,065
[45] Date of Patent: Mar. 12, 1985

[54] UNIVERSAL STERN TUBE AND PROPELLER SHAFT SEALING APPARATUS

[76] Inventor: Thomas H. Devine, 147 Jefferson Ave., Chula Vista, Calif. 92102

[21] Appl. No.: 568,573

[22] Filed: Jan. 6, 1984

[51] Int. Cl.$^3$ ............................................. F16J 15/10
[52] U.S. Cl. ...................................... 277/12; 277/105; 277/112; 277/116.2; 277/148; 277/192
[58] Field of Search ................... 277/12, 32, 102, 105, 277/106, 112, 116.2, 128, 130–132, 147, 148, 154, 178, 192, 193, 195–199, DIG. 10

[56] References Cited

U.S. PATENT DOCUMENTS

| 795,444 | 7/1905 | Kales | 277/102 X |
| 2,746,779 | 5/1956 | Lobanoff | 277/12 X |
| 3,379,444 | 4/1968 | Brummer et al. | 277/199 X |
| 3,386,746 | 6/1968 | Liebig | 277/199 X |
| 3,472,522 | 10/1969 | Winfrey | 277/105 X |
| 3,659,862 | 5/1972 | Sebestian | 277/106 |

FOREIGN PATENT DOCUMENTS

| 1525479 | 10/1969 | Fed. Rep. of Germany | 277/12 |
| 1594090 | 7/1981 | United Kingdom | 277/112 |

*Primary Examiner*—Robert S. Ward
*Attorney, Agent, or Firm*—Baker, Maxham, Callan & Jester

[57] ABSTRACT

A universal apparatus for quickly and safely sealing the external opening between a propeller shaft and a stern tube on a ship on which the stern tube has a lower portion which terminates in an aft face that is approximately perpendicular to the tube's longitudinal axis and an upper portion which extends further aft. The apparatus includes a rigid housing for generally covering said external opening; closure means coupled to the housing for creating a seal between the housing and the shaft and between the housing and the lower portion of the tube; and a mechanical expansion assembly for creating a seal between the housing and the extended upper portion of the tube. The expansion assembly includes a rigid backing plate that is integral to the housing; a movable crush plate; a malleable gasket supported by the housing and sandwiched between the plates; and means for forcing the plates together to force the gasket to expand outward from the housing to create a seal against the inner surface of the tube's extended upper portion. The housing consists of two halves that are compressed together around the shaft. The closure means includes a gasket for creating a seal around the bottom of the tube at the aft termination; and the housing includes a lip for retaining the compression gasket around the bottom of the tube to create the seal between the housing and the bottom of the tube. Two ports in the housing enable water to be evacuated from the stern tube when the apparatus seals the opening and enable air to enter the stern tube to replace the evacuated water.

25 Claims, 4 Drawing Figures

UNIVERSAL STERN TUBE AND PROPELLER SHAFT SEALING APPARATUS

BACKGROUND OF THE INVENTION

The present invention relates to an apparatus for sealing the opening between an inner shaft and an outer tube, such as the opening between a a propeller shaft and a stern tube on a ship.

Typically, a propeller shaft of a ship is enclosed in a stern tube. The stern tube, including any portion thereof inside the hull of the ship, is full of water. An inner seal, such as a packing gland or a syntron seal assembly, at the fore end of the stern tube prevents the water from freely entering the ship. Any disruption in the watertight integrity of the stern tube, or the inner seal, can lead to the influx of great quantities of water. Increased water pressure further exacerbates this problem. For example, on some ships, the stern tube is at least 30 feet under water, and the water pressure at such level forces water quickly through any breach.

To make emergency repairs or to conduct normal preventative maintenance on the inner seal, it is necessary to evacuate the water from the stern tube. This evacuation is referred to as "dewatering" the stern tube. Routine repairs on smaller vessels may be accomplished by hauling them out of the water on a marine railway. However, for large vessels requiring these repairs, only large graving docks, or floating dry docks, are capable of handling the size and weight, and these facilities are most often not available immediately. Additionally, dry docking is extremely expensive and time-consuming. Therefore, when ship scheduling or an emergency prohibits waiting for a dry dock, the external opening of the stern tube is sealed by any means available, and the stern tube is dewatered by loosening the inner seal and allowing the water to drain inside the ship. This draining of salt water into the inside of the ship is highly undesirable and much detested by the ships' masters in that it not only places large quantities of a corrosive liquid into a metal environment, but also can be dangerous. If the external seal fails, then water can flood quickly into the ship.

Some diving teams have effectively dewatered stern tubes from outside the ship by forcing a smashed pipe into the space between the propeller shaft and the inside surface at the aft face of the stern tube prior to sealing the external opening of the tube, and then utilizing an eductor head for drawing the water out of the stern tube. However, this method of dewatering also requires that a vent be provided, other than the suction pipe, in order for outside air to flow into the enclosed stern tube to replace the water that is being removed. Thus, this method also requires that the inner seal be loosened, or that some other opening be established between the inside of the ship and the inside of the stern tube in order to provide a vent through which air can freely pass. On some occasions a second pipe has been smashed into the space between the shaft and the inside surface at the aft face of the stern tube to enable air to be vented into the tube. However, the small space available in that location severely restricts the size of pipes that may be used; which results in unacceptably lengthly dewatering times.

In the prior art, the external opening of the stern tube usually has been sealed by the application of a composite of materials typically including wooden wedges, bundles of line or rope, rags, heavy neoprene tape, "wet hardening" epoxy, and the like, or, with specially constructed cofferdams. The cofferdam must be designed to fit around the propeller shaft and the stern tube and against the hull to form a water-tight seal, with calking typically used to fill any small openings at the edges of the cofferdam.

On destroyers of the Spruance class, the port side stern tube has a lower portion which terminates in an aft face that is approximately perpendicular to the longitudinal axis of the tube, and an upper portion having a concave inner surface which extends further aft. Some of the tube aft faces are slanted, either fore or aft, and some of them are truly perpendicular. Still others have corrosion problems in the termination area resulting in the loss of sizable pieces of material from the aft face of the tube which prohibit sealing the exterior opening with a contact gasket positioned against the aft face. No known cofferdams exist for sealing the exterior opening of the port side stern tube on a Spruance class destroyer.

An extremely large cofferdam would be required on such ships due to the unusual configuration of the stern tube and hull at the port propeller shaft exit point, making it necessary that the cofferdam extend from forward of the forward end of the stern tube barrel, to aft of the aft end of the upper portion of the stern tube that extends aft. The overall distance is a minimum of 12 feet.

A cofferdam of sufficient size and strength to safely seal the external opening between the propeller shaft and stern tube on such ships would be so large and bulky as to require a heavy crane for topside (surface) handling, plus an oversized diving crew for handling it underwater where no crane can be placed to help. Additionally, the weight off such a cofferdam would pose a serious hazard to the divers attempting to control its movement in a confined area between ship's hull, stern tube and propeller shaft while performing the installation.

The prior art method of applying composite materials to seal the exterior opening of the stern tube typically takes two or three days. In addition, such applications of composite materials have collspsed on some occasions and developed substantial leaks on other occasions after the inner seal to the stern tube has been removed and thereby placed the entire ship in jeopardy.

SUMMARY OF THE INVENTION

The present invention is a universal sealing apparatus for quickly and safetly sealing the opening between a propeller shaft and a stern tube on a ship, while simultaneously providing a controllable external stern tube back-flooding and dewatering capability, as desired during the normal course of repairs to the propeller shaft components. The sealing apparatus is universal in that it can be used on all ships of a given class notwithstanding minor variations in the construction of the stern tube. The preferred embodiment of the sealing apparatus of the present invention is particularly suited for quickly and safely sealing the external opening between a propeller shaft and a stern tube on a ship on which the stern tube has a lower portion which terminates in an aft face that is approximately perpendicular to the tube's longitudinal axis, and an upper portion which extends further aft. Such preferred embodiment includes a rigid housing for generally covering the external opening between the shaft and the tube; closure means coupled to the housing for creating a seal between the housing and the shaft and between the housing and the lower portion of the tube; and a mechanical expansion assembly for creating a seal between the housing and the extended upper portion of the tube. The expansion assembly includes a rigid backing plate that is integral to the housing; a movable crush plate; a malleable gasket supported by the housing and sandwiched between the plates; and means for forcing the plates together to force the gasket to expand outward from the housing to create a seal against the inner surface of the tube's extended upper portion. The housing includes two halves that, upon installation of the apparatus to seal the opening, are compressed together around the shaft. The closure means includes a gasket for creating a seal around the bottom of the tube at the aft termination; and the housing includes a lip for retaining the compression gasket around the bottom of the tube to create the seal between the housing and the bottom of the tube.

Another feature of the present invention is that the housing includes a first port for enabling water to be evacuated from the stern tube when the apparatus seals the opening between the shaft and the stern tube and a second port for enabling air to enter the stern tube to replace the evacuated water. Preferably, the interior opening of said first port is positioned to be adjacent the shaft and on the side of the housing that faces the inside of the tube when the apparatus is installed. Positioning the first port adjacent the shaft makes it less likely that the first port will be clogged by debris.

In separate aspects of the present invention, the mechanical expansion assembly described above is useful for sealing at least part of the opening between a shaft and a tube through which the shaft extends; and the closure means described above is useful for sealing around at last part of the tube at the external opening between a shaft and a tube through which the shaft extends, wherein at least a portion of the tube terminates in an end face that is approximately perpendicular to the tube's longitudinal axis.

The sealing apparatus of the present invention can be installed on large ships, such as destroyers of the Spruance class, in less than three hours, including the total dewatering of the stern tube; whereas the prior art techniques described above for sealing the external opening of the stern tube on such ships takes up to three days to accomplish. Further, the seal provided by the sealing apparatus of the present invention is far superior from a tightness and safety standpoint, to that provided by a composite of materials and/or a cofferdam.

Additional features of the present invention are discussed in relation to the detailed description of the invention.

DETAILED DESCRIPTION OF THE INVENTION

Figure 1:
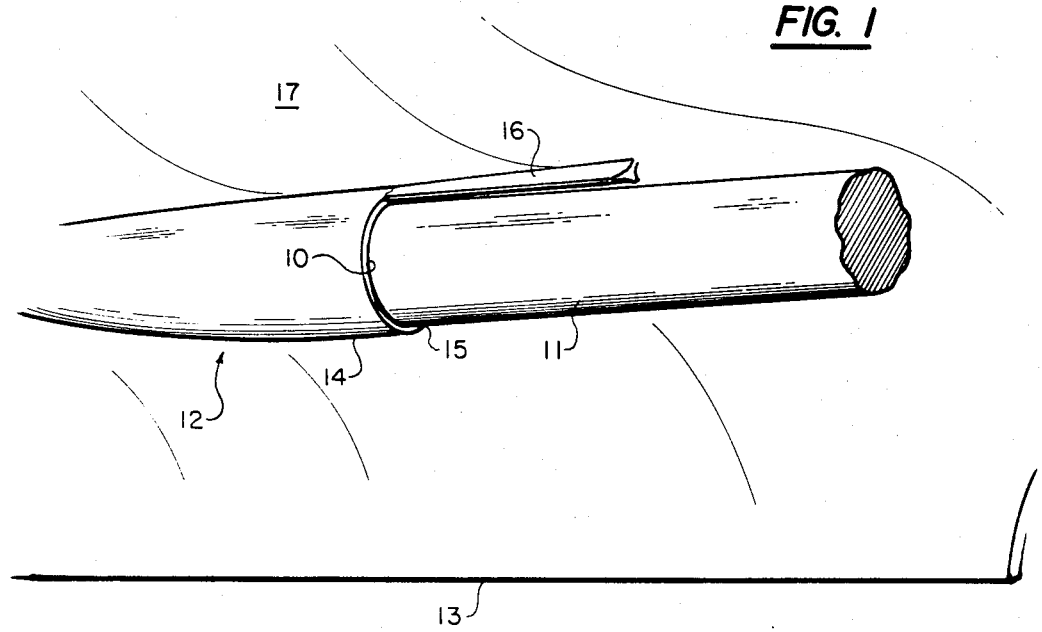
FIG. 1 is a perspective view showing the external opening between a propeller shaft and a stern tube on a ship on which the stern tube has a lower portion which terminates in an end face that is perpendicular to the tube's longitudinal axis and an upper portion which extends further aft.

The type of external opening for which the preferred embodiment of the sealing apparatus of the present invention is particularly suited is shown in FIG. 1.

The external opening 10 is between a propeller shaft 11 and a stern tube 12 on a ship 13. The stern tube 12 has a lower portion 14 which terminates in an aft face 15 that is approximately perpendicular to the tube's longitudinal axis and an upper portion 16 having a concave inner surface which extends further aft.

The space between the propeller shaft 11 and the stern tube 12 usually is occupied by water. Where the stern tube 12 terminates inside the hull 17 of the ship 13, a packing gland (not shown) seals the internal opening between the shaft 11 and the stern tube 12.

Figure 2:
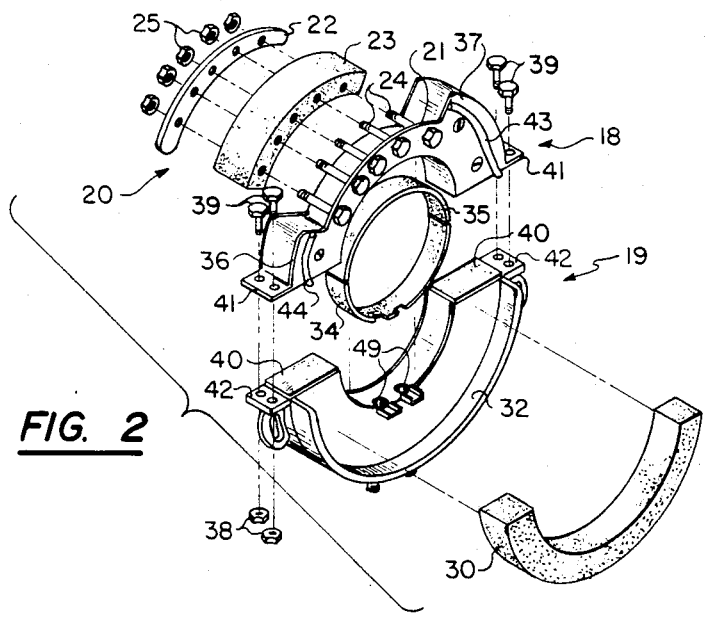
FIG. 2 is an exploded view of a preferred embodiment of the sealing apparatus of the present invention.
Figure 3:
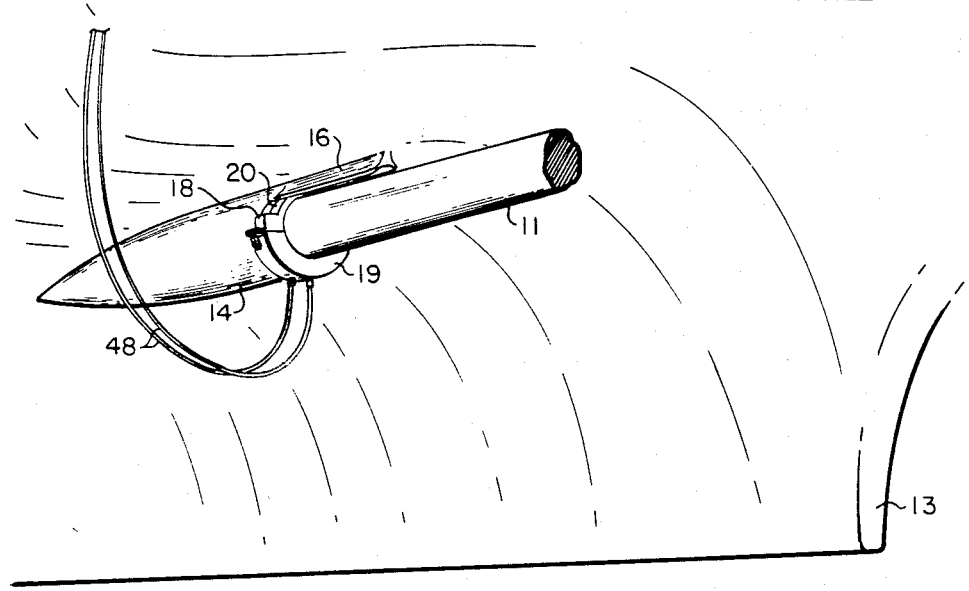
FIG. 3 is a perspective view showing the preferred embodiment of the sealing apparatus of FIG. 2 installed to seal the external opening illustrated in FIG. 1.
Figure 4:
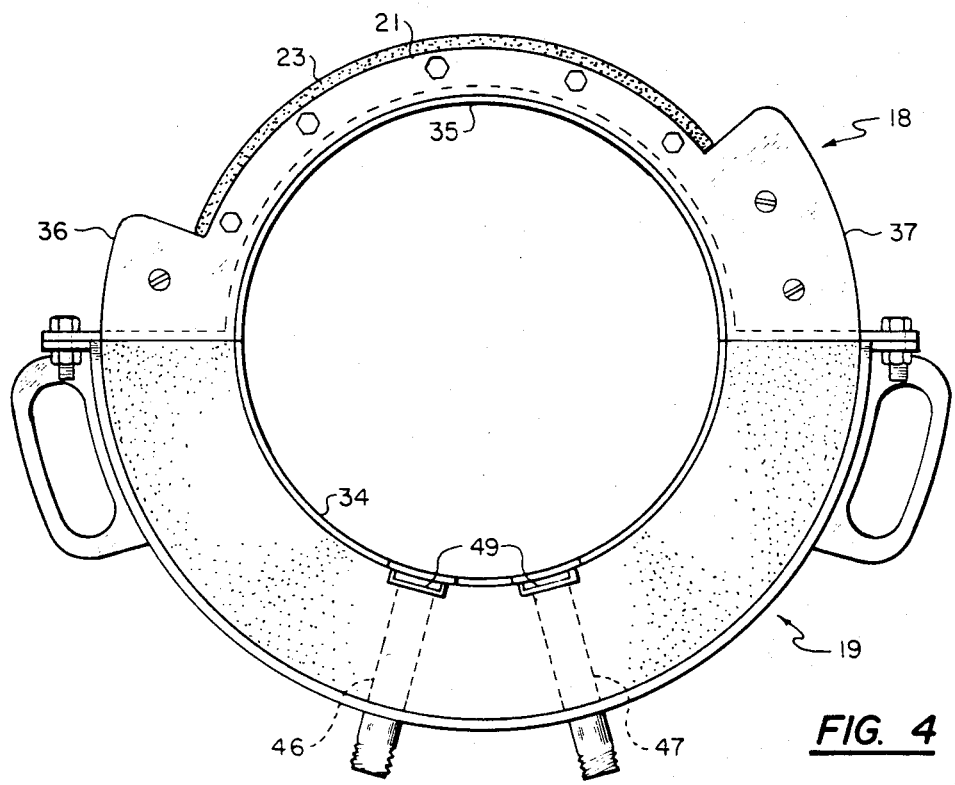
FIG. 4 is a plane view of the preferred embodiment in FIG. 2.

Referring to FIGS. 2, 3 and 4, the preferred embodiment of the sealing apparatus of the present invention includes a two-part rigid housing for generally covering the external opening 10. The housing includes an upper half 18 and a lower half 19, that upon installation to seal the opening 10, are compressed together around the shaft 11.

The apparatus further includes a mechanical expansion assembly 20 for creating a seal between the upper half of the housing 18 and the extended upper portion 16 of the stern tube 12.

The mechanical expansion assembly 20 includes a rigid backing plate 21 that is integral to the upper half of the housing 18, a movable crush plate 22, a malleable gasket 23, bolts 24 and nuts 25. The gasket 23 is closed-cell neoprene rubber. The gasket 23 is supported by the upper half of the housing 18 and sandwiched between the plates 21, 22. The bolts 24 pass through the plates 21, 22 and the malleable gasket 23 and can be tightened by the nuts 25 to force the movable crush plate 22 toward the rigid backing plate 21 to thereby force the gasket 23 to expand outward from the upper half of the housing 18 to create a seal against the concave inner surface of the extended portion 16 of the stern tube 12.

The sealing apparatus also includes closure means coupled to the housing 18, 19 for creating a seal between the housing 18, 19 and the shaft 11 and between the housing 18, 19 and the lower portion 14 of the tube 12. The closure means includes a compression gasket 30 for creating a seal around the bottom of the lower portion 14 of the tube 12 at the aft termination. The lower half 19 of the housing includes a lip 32 for retaining the compression gasket 30 around the bottom of the tube 12 to create the seal between the lower half 19 of the housing and the bottom of the tube 12. The closure means also includes compression gaskets 34 and 35, which are fitted around the shaft 11 to create a seal between the housing 18, 19 and the shaft 11 when the upper and lower halves 18, 19 of the housing are secured together. The upper and lower halves 18, 19 of the housing are secured together by nuts 38 and bolts 39. Gaskets 40 are positioned between mating surfaces of the upper and lower halves 18, 19 of the housing to create a seal between the housing halves 18, 19 when they are secured together.

The upper and lower halves 18 and 19 of the housing have lateral peripheral flanges 41 and 42, as shown in FIG. 2, containing holes through which the bolts 39 are fitted to secure the upper and lower halves 18, 19 together.

The upper half 18 of the housing also includes first and second radially extended segments 36 and 37 that face against the top part of the lower portion 14 of the stern tube 12 when the sealing apparatus is installed. Strips of silicone calking sealer 43 and 44 are applied to the radially extended segments 37, 36, respectively, to create a seal between the upper half 18 of the housing and the top part of the lower portion 14 of the stern tube 12. Alternatively, contact gaskets (not shown) can be substituted for the calking sealer 43, 44. The first and second radially extended portions 36, 37 are of different dimensions because there is less clearance between the shaft 11 and the hull 17 on the side of the stern tube 12 that is adjacent the hull 17. The first radially extended portion 36 is positioned adjacent the hull 17 when the sealing apparatus is installed.

Upon installation, the upper half 18 of the housing is placed between the propeller shaft 11 and the extended upper portion 16 of the stern tube 12. The fore side of the sealing apparatus as viewed in FIGS. 2 and 4 faces inward against the aft face 15 of the stern tube 12.

The lower half 19 of the housing is loosely fastened to the upper half of the housing 18 by the nuts 38 and the bolts 39 and the sealing apparatus is moved inward until it contacts the aft face 15 of the stern tube 12. Tightening the nuts 38 on the bolts 39 causes the compression gasket 30 to create a seal between the lower half 19 of the housing and the bottom of the stern tube 12, causes the gaskets 34 and 35 to create a seal between the housing 18, 19 and the shaft 11, and also creates a seal between the upper and lower halves 18, 19 of the housing. The nuts 25 of the mechanical expansion assembly 20 are then tightened on the bolts 24 to force the movable crush plate 22 toward the rigid backing plate 21, thereby forcing the malleable gasket 23 to expand outward to create a seal against the inner surface of the upper extended portion 16 of the stern tube 12.

Two ports 46, 47 extend through the housing 18, 19 to enable dewatering of the stern tube 12 when the external opening of the tube is sealed. Referring to FIG. 3, hoses 48 are connected to the two ports 46, 47 and extend above the surface of the water. Water is pumped out of the stern tube 12 through one port 46 and air is allowed to enter the stern tube 12 from above the surface through the other port 47 to replace the air evacuated through the one port 46.

The lower half 19 of the housing includes trays 49 at the interior openings of the respective ports 46, 47. The trays 49 extend from the main body of the housing 19 to be interposed between the termination of the stern tube 12 and the compression gasket 30 when the sealing apparatus is installed so that the interior opening of each of the ports 46, 47 actually extends from a position that is forward of the aft face of the stern tube to lessen the likelihood of the ports 46, 47 being clogged with debris.

In an alternative embodiment (not shown), wherein the sealing apparatus is adapted to seal an opening between a shaft and a concentric tube which terminates in an end face that is approximately perpendicular to the longitudinal axis of the tube, the sealing apparatus includes both upper and lower housing halves constructed in the same manner as the lower housing half 19 illustrated in FIGS. 2 and 4, except the upper half does not contain the ports 46, 47.

In another alternative embodiment (not shown), wherein the sealing apparatus is adapted for sealing the opening between a shaft and a tube through which the shaft extends, the sealing apparatus includes a circular mechanical expansion assembly. The expansion assembly includes upper and lower half assemblies such as the expansion assembly portion 20 of the upper half 18 of the housing shown in FIGS. 2 and 4. No portion of either assembly would be radially extended in the manner of the radially extended segments 36, 37. The upper and lower assemblies in this alternative embodiment are secured together after installation by the compression created when the expansion assemblies are tightened to expand the malleable gaskets outward to create a seal against the inner surface of the tube.

What is claimed is:

1. An apparatus for sealing the external opening between a propeller shaft and a stern tube on a ship on which the stern tube has a lower portion which terminates in an aft face that is approximately perpendicular to the tube's longitudinal axis and an upper portion which extends further aft; said apparatus comprising
   a rigid housing for generally covering said external opening;
   closure means coupled to the housing for creating a seal between the housing and the shaft and between the housing and the lower portion of the tube; and
   a mechanical expansion assembly for creating a seal between the housing and the extended upper portion of the tube, said expansion assembly including
      a rigid backing plate that is integral to the housing;
      a movable crush plate;
      a malleable gasket supported by the housing and sandwiched between the plates; and
      means for forcing the plates together to force the gasket to expand outward from the housing to create a seal against the inner surface of the tube's extended upper portion.

2. An apparatus according to claim 1,
   wherein the housing consists of two halves that, upon installation of the apparatus to seal the opening, are compressed together around the shaft.

3. An apparatus according to claim 2,
   wherein the closure means includes a compression gasket for creating a seal around the bottom of the tube at said termination; and
   wherein the housing includes a lip for retaining the compression gasket around the bottom of the tube to create said seal between the housing and the bottom of the tube.

4. An apparatus according to claim 3,
   wherein the housing defines a first port for enabling water to be evacuated from the stern tube when the apparatus seals the opening between the shaft and the stern tube and a second port for enabling air to enter the stern tube to replace the evacuated water.

5. An apparatus according to claim 4,
   wherein the interior opening of said first port extends from a position that is forward of the aft face of the tube when the apparatus is installed to seal the opening to lessen the likelihood of the first port being clogged with debris.

6. An apparatus according to claim 2,
   wherein the housing defines a first port for enabling water to be evacuated from the stern tube when the apparatus seals the opening between the shaft and the stern tube and a second port for enabling air to enter the stern tube to replace the evacuated water.

7. An apparatus according to claim 6,
   wherein the interior opening of said first port extends from a position that is forward of the aft face of the tube when the apparatus is installed to seal the opening to lessen the likelihood of the first port being clogged with debris.

8. An apparatus according to claim 1,
wherein the closure means includes a compression gasket for creating a seal around the bottom of the tube at said termination; and
wherein the housing includes a lip for retaining the compression gasket around the bottom of the tube to create said seal between the housing and the bottom of the tube.

9. An apparatus according to claim 8,
wherein the housing defines a first port for enabling water to be evacuated from the stern tube when the apparatus seals the opening between the shaft and the stern tube and a second port for enabling air to enter the stern tube to replace the evacuated water.

10. An apparatus according to claim 9,
wherein the interior opening of said first port extends from a position that is forward of the aft face of the tube when the apparatus is installed to seal the opening to lessen the likelihood of the first port being clogged with debris.

11. An apparatus according to claim 1,
wherein the housing defines a first port for enabling water to be evacuated from the stern tube when the apparatus seals the opening between the shaft and the stern tube and a second port for enabling air to enter the stern tube to replace the evacuated water.

12. An apparatus according to claim 11,
wherein the interior opening of said first port extends from a position that is forward of the aft face of the tube when the apparatus is installed to seal the opening to lessen the likelihood of the first port being clogged with debris.

13. An apparatus for sealing the opening between a shaft and a tube through which the shaft extends, comprising
a rigid housing for generally filling said opening;
closure means coupled to the housing for creating a seal between the housing and the shaft; and
a mechanical expansion assembly for creating a seal between the housing and at least part of the tube, said expansion assembly including
a rigid backing plate that is integral to the housing;
a movable crush plate;
a malleable gasket supported by the housing and sandwiched between the plates; and
means for forcing the plates together to force the gasket to expand outward from the housing to create a seal against the inner surface of the tube.

14. An apparatus according to claim 13,
wherein the housing consists of two halves that, upon installation of the apparatus to seal the opening, are compressed together around the shaft.

15. An apparatus according to claim 13,
wherein the housing defines a port for enabling water to be evacuated from the tube when the apparatus seals the opening between the shaft and the tube.

16. An apparatus according to claim 15,
wherein the interior opening of said port extends from a position that is forward of the main body of the housing when the apparatus is installed to seal the opening to lessen the likelihood of said port being clogged with debris.

17. An apparatus according to claim 15,
wherein the housing further defines a second port for enabling air to enter the tube to replace the evacuated water 18. An apparatus for sealing the external opening between a shaft and a tube through which the shaft extends, wherein at least a portion of the tube terminates in a face that is approximately perpendicular to the tube's longitudinal axis; said apparatus comprising
a rigid housing for generally covering said external opening; and
closure means coupled to the housing for creating a seal between the housing and the shaft and between the housing and at least part of the tube;
wherein the closure means includes a compression gasket for creating a seal around at least part of the tube at said termination; and
wherein the housing includes a lip for retaining the compression gasket against the tube to create said seal between the housing and said part of the tube.

19. An apparatus according to claim 18,
wherein the housing consists of two halves that, upon installation of the apparatus to seal the opening, are compressed together around the shaft.

20. An apparatus according to claim 18,
wherein the housing defines a port for enabling water to be evacuated from the tube when the apparatus seals the opening between the shaft and the tube.

21. An apparatus according to claim 20,
wherein the interior opening of said port extends from a position that is forward of the termination of the tube when the apparatus is installed to seal the opening to lessen the likelihood of said port being clogged with debris.

22. An apparatus according to claim 20,
wherein the housing further defines a second port for enabling air to enter the tube to replace the evacuated water 23. An apparatus for sealing the external opening between a shaft and a tube through which the shaft extends, said apparatus comprising
a rigid housing for generally covering said external opening; and
closure means coupled to the housing for creating a seal between the housing and the shaft and between the housing and at least part of the tube;
wherein the housing defines a port for enabling water to be evacuated from the tube when the apparatus seals the opening between the shaft and the tube.

24. An apparatus according to claim 23,
wherein the interior opening of said port extends from a position that is forward of the termination of the tube when the apparatus is installed to seal the opening to lessen the likelihood of said opening being clogged with debris.

25. An apparatus according to claim 23,
wherein the housing further defines a second port for enabling air to enter the tube to replace the evacuated water.

* * * * *